(12) United States Patent
Kim et al.

(10) Patent No.: US 10,805,319 B2
(45) Date of Patent: Oct. 13, 2020

(54) STEPPING-STONE DETECTION APPARATUS AND METHOD

(71) Applicant: ELECTRONICS AND TELECOMMUNICATIONS RESEARCH INSTITUTE, Daejeon (KR)

(72) Inventors: Jung-Tae Kim, Daejeon (KR); Ik-Kyun Kim, Daejeon (KR); Koo-Hong Kang, Cheongju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 198 days.

(21) Appl. No.: 15/807,425

(22) Filed: Nov. 8, 2017

(65) Prior Publication Data
US 2018/0234436 A1 Aug. 16, 2018

(30) Foreign Application Priority Data
Feb. 14, 2017 (KR) .......................... 10-2017-0020118

(51) Int. Cl.
*H04L 29/06* (2006.01)
*H04L 12/721* (2013.01)
(Continued)

(52) U.S. Cl.
CPC .......... *H04L 63/1416* (2013.01); *H04L 45/02* (2013.01); *H04L 45/20* (2013.01);
(Continued)

(58) Field of Classification Search
CPC . H04L 63/1416; H04L 63/1458; H04L 45/20; H04L 45/36; H04L 45/02; H04L 2463/121
(Continued)

(56) References Cited

U.S. PATENT DOCUMENTS 6,560,273 B1 * 5/2003 Sourour ............... H04B 1/7115
                                                    375/147
7,814,546 B1 * 10/2010 Strayer ............... H04L 63/1416
                                                    726/23
(Continued)

FOREIGN PATENT DOCUMENTS

KR       10-0564750 B1      3/2006
KR    10-2009-0009622 A     1/2009
(Continued)

*Primary Examiner* — Mohammad W Reza

(57) ABSTRACT

Disclosed herein are a stepping-stone detection apparatus and method. The stepping-stone detection apparatus includes a target connection information reception unit for receiving information about a target connection from an intrusion detection system (IDS), a fingerprint generation unit for generating a target connection fingerprint based on the information about the target connection, and generating one or more candidate connection fingerprints using information about one or more candidate connections corresponding to one or more flow information collectors, and a stepping-stone detection unit for detecting a stepping stone by comparing the target connection fingerprint, in which a maximum allowable delay time is reflected, with the candidate connection fingerprints.

16 Claims, 9 Drawing Sheets

(51) Int. Cl.
*H04L 12/733* (2013.01)
*H04L 12/751* (2013.01)

(52) U.S. Cl.
CPC .......... *H04L 45/36* (2013.01); *H04L 63/1458* (2013.01); *H04L 2463/121* (2013.01)

(58) Field of Classification Search
USPC .......................................................... 726/23
See application file for complete search history.

(56) References Cited

U.S. PATENT DOCUMENTS

| | | | |
|---|---|---|---|
| 7,836,360 B2* | 11/2010 | Zufelt | H04L 41/0663 |
| | | | 714/49 |
| 8,125,898 B1* | 2/2012 | Strayer | H04L 63/1458 |
| | | | 370/230 |
| 8,307,441 B2 | 11/2012 | Kim et al. | |
| 9,374,382 B2 | 6/2016 | Han et al. | |
| 9,537,887 B2 | 1/2017 | Choi et al. | |
| 2007/0019585 A1* | 1/2007 | Chiu | H04B 1/7117 |
| | | | 370/335 |
| 2010/0067377 A1* | 3/2010 | Wang | H04L 63/1425 |
| | | | 370/230 |
| 2011/0138463 A1 | 6/2011 | Kim et al. | |
| 2015/0256555 A1 | 9/2015 | Choi et al. | |

FOREIGN PATENT DOCUMENTS

| | | |
|---|---|---|
| KR | 10-0882809 B1 | 2/2009 |
| KR | 10-1267493 B1 | 5/2013 |
| KR | 10-1352553 B1 | 1/2014 |
| KR | 10-2015-0105039 A | 9/2015 |

\* cited by examiner

STEPPING-STONE DETECTION APPARATUS AND METHOD

CROSS REFERENCE TO RELATED APPLICATION

This application claims the benefit of Korean Patent Application No. 10-2017-0020118, filed Feb. 14, 2017, which is hereby incorporated by reference in its entirety into this application.

BACKGROUND OF THE INVENTION

1. Technical Field

The present invention relates generally to stepping-stone detection technology and, more particularly, to technology for detecting information about an attack session through which an attacker gains access and for back-tracking intermediate hosts in an attack path and the source of an attack in real time by overcoming timing perturbation technology, which is used as evasive attack technology by the attacker, thus detecting stepping stones.

2. Description of the Related Art

To solve security problems such as in existing rsh, rlogin, and telnet, a Secure Shell (SSH) has been designed. Such a Secure Shell (SSH) is an application program or a protocol based thereon, which enables login to another computer on a network or enables a remote system to execute commands and to copy files to other systems, and which provides a strong authentication method and a secure communication function.

Meanwhile, most intermediate host (i.e., stepping stone) detection systems are configured to detect intermediate hosts using information about packet timing related to interactive service connections. Therefore, attackers perturb timing information about their traffic streams at intermediate hosts in order to evade such stepping-stone detection systems.

In order for attackers to produce very precise timing variation for the purpose of evading stepping-stone detection systems, a pseudo terminal function, a buffering effect, etc. in interactive services, such as telnet or a Secure Shell (SSH), must be taken into consideration.

Therefore, there is required the development of technology for, when an attacker attempts timing perturbation using uniformly distributed delays, detecting the characteristics of traffic timing generated at that time, determining information about an attack session through which the attacker gains access based on the detected information, and then back-tracking intermediate hosts in an attack path and the source of an attack in real time.

In connection with this, Korean Patent Application Publication No. 10-2015-0105039 (Date of publication: Sep. 16, 2015) discloses a technology related to "Method and System for Network Connection-Chain Traceback using Network Flow Data."

SUMMARY OF THE INVENTION

Accordingly, the present invention has been made keeping in mind the above problems occurring in the prior art, and an object of the present invention is to detect information about an attack session through which an attacker gains access and to back-track intermediate hosts in an attack path and the source of an attack in real time by overcoming timing perturbation technology attempted by the attacker.

Another object of the present invention is to detect a connection including a modified traffic stream based on the fingerprint of a final attack stream.

A further object of the present invention is to detect attacks that are difficult to detect using conventional technology, that is, a Denial of Service (DoS) attack using a slow rate, a hacking attack that intentionally causes a delay, etc.

In accordance with an aspect of the present invention to accomplish the above objects, there is provided a stepping-stone detection apparatus, including a target connection information reception unit for receiving information about a target connection from an intrusion detection system (IDS), a fingerprint generation unit for generating a target connection fingerprint based on the information about the target connection, and generating one or more candidate connection fingerprints using information about one or more candidate connections corresponding to one or more flow information collectors, and a stepping-stone detection unit for detecting a stepping stone by comparing the target connection fingerprint, in which a maximum allowable delay time is reflected, with the candidate connection fingerprints.

The target connection fingerprint may be a vector of ON time duration and OFF time duration corresponding to the information about the target connection.

The stepping-stone detection unit may calculate a total matched time ratio including at least one of a total matched time ratio corresponding to the ON time duration and a total matched time ratio corresponding to the OFF time duration, and may determine that the stepping stone has been detected if the calculated total matched time ratio is equal to or greater than a preset threshold.

The stepping-stone detection unit may calculate the total matched time ratio corresponding to the ON time duration by dividing information about an overlap between the target connection fingerprint and each candidate connection fingerprint during the ON time duration by the ON time duration of the target connection fingerprint.

The stepping-stone detection unit may calculate the total matched time ratio corresponding to the OFF time duration by dividing information about an overlap between the target connection fingerprint and each candidate connection fingerprint during the OFF time duration by the OFF time duration of the target connection fingerprint.

The stepping-stone detection unit may determine that the target connection and the corresponding candidate connection are the stepping stone if the total matched time ratio corresponding to the ON time duration is equal to or greater than a first threshold or if the total matched time ratio corresponding to the OFF time duration is equal to or greater than a second threshold.

The stepping-stone detection unit may repeatedly compare the target connection fingerprint with each candidate connection fingerprint by performing discrete time jumping/sliding.

The stepping-stone detection unit may repeatedly compare the target connection fingerprint with each candidate connection fingerprint by performing the discrete time jumping/sliding by a unit time within a range of the maximum allowable delay time.

The stepping-stone detection apparatus may further include a stepping-stone detection request unit for sending a stepping-stone detection request message to a neighboring stepping-stone detection apparatus.

The stepping-stone detection request unit may send the stepping-stone detection request message, including the target connection fingerprint, to one or more neighboring stepping-stone detection apparatuses.

In accordance with another aspect of the present invention to accomplish the above objects, there is provided a stepping-stone detection method performed by a stepping-stone detection apparatus, including receiving information about a target connection from an intrusion detection system (IDS), generating a target connection fingerprint based on the information about the target connection, generating one or more candidate connection fingerprints using information about one or more candidate connections corresponding to one or more flow information collectors, and detecting a stepping stone by comparing the target connection fingerprint, in which a maximum allowable delay time is reflected, with the candidate connection fingerprints.

The target connection fingerprint may be a vector of ON time duration and OFF time duration corresponding to the information about the target connection.

Detecting the stepping stone may include calculating a total matched time ratio including at least one of a total matched time ratio corresponding to the ON time duration and a total matched time ratio corresponding to the OFF time duration, and determining that the stepping stone has been detected if the calculated total matched time ratio is equal to or greater than a preset threshold.

Calculating the total matched time ratio may be configured to calculate the total matched time ratio corresponding to the ON time duration by dividing information about an overlap between the target connection fingerprint and each candidate connection fingerprint during the ON time duration by the ON time duration of the target connection fingerprint.

Calculating the total matched time ratio may be configured to calculate the total matched time ratio corresponding to the OFF time duration by dividing information about an overlap between the target connection fingerprint and each candidate connection fingerprint during the OFF time duration by the OFF time duration of the target connection fingerprint.

Determining that the stepping stone has been detected may be configured to determine that the target connection and the corresponding candidate connection are the stepping stone if the total matched time ratio corresponding to the ON time duration is equal to or greater than a first threshold or if the total matched time ratio corresponding to the OFF time duration is equal to or greater than a second threshold.

Calculating the total matched time ratio may be configured to repeatedly compare the target connection fingerprint with each candidate connection fingerprint by performing discrete time jumping/sliding.

Calculating the total matched time ratio may be configured to repeatedly compare the target connection fingerprint with each candidate connection fingerprint by performing the discrete time jumping/sliding by a unit time within a range of the maximum allowable delay time.

The stepping-stone detection method may further include sending a stepping-stone detection request message to a neighboring stepping-stone detection apparatus.

Sending the stepping-stone detection request message may be configured to send the stepping-stone detection request message, including the target connection fingerprint, to one or more neighboring stepping-stone detection apparatuses.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
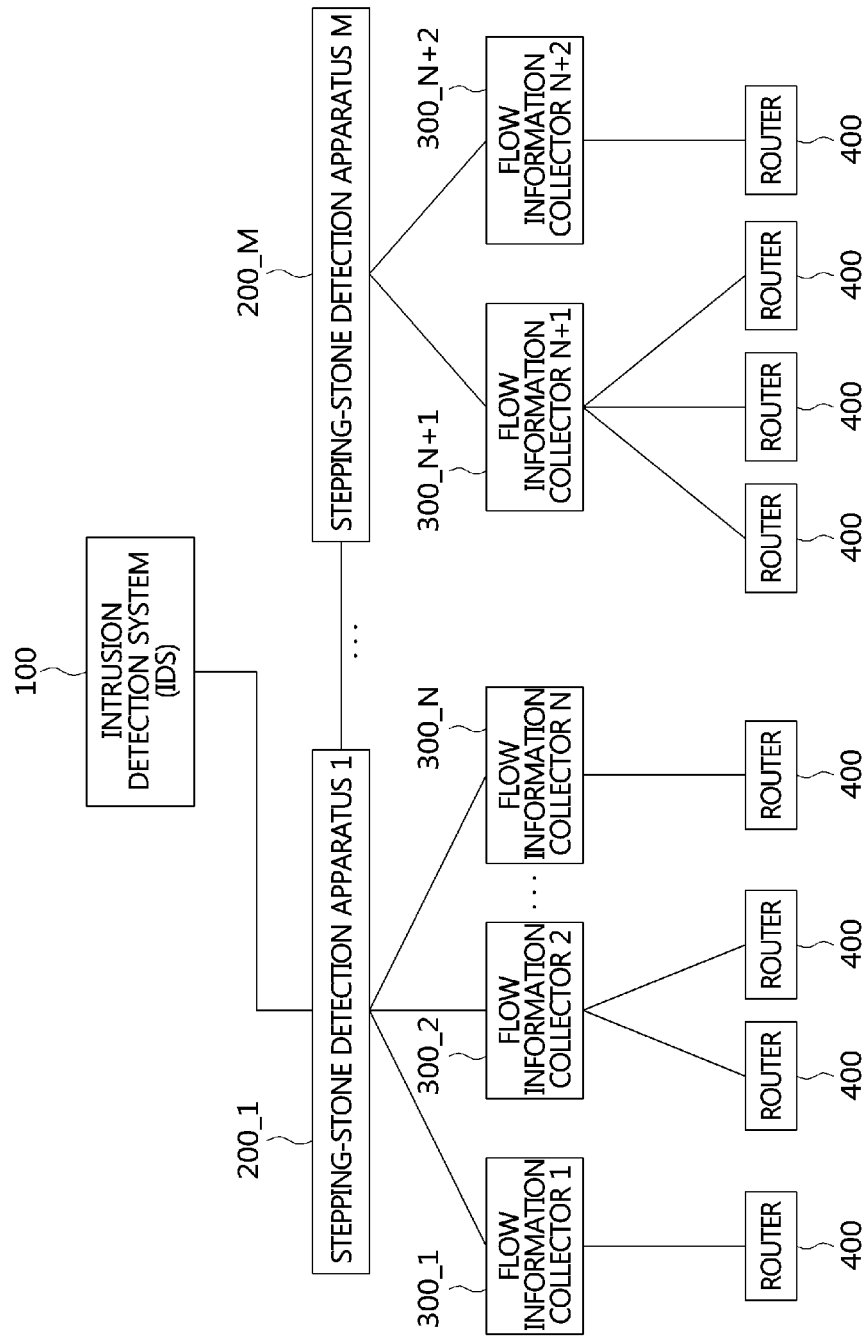
FIG. 1 is a diagram schematically illustrating a stepping-stone detection system according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a diagram schematically illustrating a stepping-stone detection system according to an embodiment of the present invention.

As illustrated in FIG. 1, the stepping-stone detection system includes an Intrusion Detection System (IDS) 100, one or more stepping-stone detection apparatuses 200, and a plurality of flow information collectors 300.

First, the IDS 100 generates information about a target connection, which is a connection corresponding to the last hop of a session in which an attack is attempted, using intermediate hosts, and transmits the generated information about the target connection to the corresponding stepping-stone detection apparatus 200. Here, the information about the target connection may include a source Internet Protocol (IP) address, a destination IP address, a source port number, a destination port number, and a protocol type for the target connection.

Further, each of the stepping-stone detection apparatuses 200 receives the information about the target connection from the IDS 100 and generates a target connection fingerprint based on the information about the target connection, stored in the stepping-stone detection apparatus 200. Here, the target connection fingerprint may be generated to detect stepping stones, and may be a vector of ON time duration and OFF time duration corresponding to the target connection.

The stepping-stone detection apparatus 200 generates candidate connection fingerprints respectively corresponding to one or more collected candidate connections using information about the candidate connections. Here, the information about the candidate connections may be received from the plurality of flow information collectors 300 connected to the stepping-stone detection apparatus 200.

Further, the stepping-stone detection apparatus 200 detects stepping stones, which are intermediate hosts, using the target connection fingerprint and the candidate connection fingerprints. Here, there may occur a synchronization error in which sequence synchronization between the ON time durations and OFF time durations of the target connection fingerprint and the candidate connection fingerprints, which are to be compared with each other, is broken.

Therefore, the stepping-stone detection apparatus 200 corrects the target connection fingerprint by a maximum allowable delay time so as to calculate a similarity between the target connection fingerprint and each candidate connection fingerprint. Further, the stepping-stone detection apparatus 200 detects a stepping stone by comparing the corrected target connection fingerprint with each candidate connection fingerprint.

Also, a stepping-stone detection apparatus 200_1 allows a neighboring stepping-stone detection apparatus 200_M to detect a stepping stone by sending a stepping-stone detection request message to the neighboring stepping-stone detection apparatus 200_M. Here, the stepping-stone detection request message may include a fingerprint generated by the stepping-stone detection apparatus 200_1.

Next, the flow information collectors 300 collect flow information from one or more routers 400. Further, the flow information collectors 300 allow the stepping-stone detection apparatus 200 to search for flow information by storing the collected flow information. That is, the stepping-stone detection apparatus 200 may be connected to the plurality of flow information collectors 300 and may then search for flow information stored in the flow information collectors 300.

The stepping-stone detection system may have a 2-tier structure composed of the stepping-stone detection apparatuses 200 and the flow information collectors 300. Further, the locations of the stepping-stone detection apparatuses 200 and the flow information collectors 300 may be dependent on the locations of the routers 400 so as to prevent incidental network traffic from increasing.

In order to prevent incidental network traffic, such as traffic between the stepping-stone detection apparatuses 200 and the flow information collectors 300 or traffic between the flow information collectors 300 and the routers 400, from increasing, the locations of the stepping-stone detection apparatuses 200 and the flow information collectors 300 are described as being dependent on the routers 40, but the present invention is not limited thereto, and the stepping-stone detection apparatuses 200 and the flow information collectors 300 may be disposed at any location at which the network is connected as the occasion demands.

Hereinafter, the configuration of a stepping-stone detection apparatus according to an embodiment of the present invention will be described in detail with reference to FIG. 2.

Figure 2:
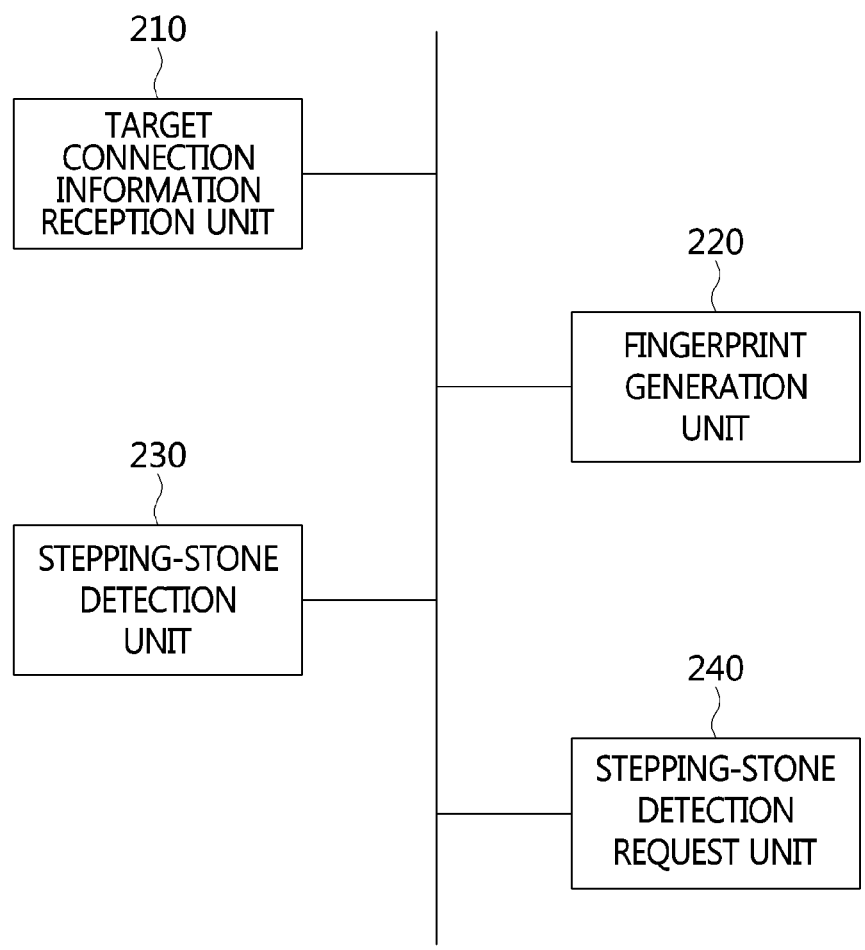
FIG. 2 is a block diagram illustrating the configuration of a stepping-stone detection apparatus according to an embodiment of the present invention.

FIG. 2 is a block diagram illustrating the configuration of the stepping-stone detection apparatus according to an embodiment of the present invention.

As illustrated in FIG. 2, the stepping-stone detection apparatus 200 may include a target connection information reception unit 210, a fingerprint generation unit 220, a stepping-stone detection unit 230, and a stepping-stone detection request unit 240.

First, the target connection information reception unit 210 receives information about a target connection from an Intrusion Detection System (IDS).

Here, the information about the target connection may mean information about a 5-tuple corresponding to the target connection (i.e. a source IP address, a destination IP address, a source port number, a destination port number, and a protocol ID).

The fingerprint generation unit 220 generates a target connection fingerprint based on the received information about the target connection.

Further, the fingerprint generation unit 220 generates candidate connection fingerprints using information about candidate connections corresponding to one or more flow information collectors. Here, the fingerprint generation unit 220 may generate candidate connection-based fingerprints for respective pieces of information about one or more candidate connections.

The stepping-stone detection unit 230 detects a stepping stone by comparing the target connection fingerprint in which the maximum allowable delay time is reflected with the candidate connection fingerprints.

Here, the stepping-stone detection unit 230 may calculate a total matched time ratio including at least one of a total matched time ratio corresponding to ON time duration and a total matched time ratio corresponding to OFF time duration, and may determine that a stepping stone has been detected when the calculated total matched time ratio is equal to or greater than a preset threshold.

In particular, the stepping-stone detection unit 230 may calculate the total matched time ratio corresponding to the ON time duration by dividing information about overlap between the target connection fingerprint and the corresponding candidate connection fingerprint during ON time duration by the ON time duration of the target connection fingerprint.

Further, the stepping-stone detection unit 230 may calculate the total matched time ratio corresponding to the OFF time duration by dividing information about overlap between the target connection fingerprint and the corresponding candidate connection fingerprint during OFF time duration by the OFF time duration of the target connection fingerprint.

Also, the stepping-stone detection unit 230 may determine that the stepping stone has been detected if the total matched time ratio corresponding to the ON time duration is equal to or greater than a first threshold or if the total matched time ratio corresponding to the OFF time duration is equal to or greater than a second threshold.

Here, the stepping-stone detection unit 230 may repeatedly compare the target connection fingerprint with candidate connection fingerprints by performing discrete time jumping/sliding. The stepping-stone detection unit 230 may repeatedly compare the target connection fingerprint with the candidate connection fingerprints by performing discrete time jumping/sliding by a unit time within the maximum allowable delay time.

Finally, the stepping-stone detection request unit 240 sends a stepping-stone detection request message to neighboring stepping-stone detection apparatuses. Here, the stepping-stone detection request unit 240 sends the stepping-stone detection request message, including the target connection fingerprint, to one or more neighboring stepping-stone detection apparatuses.

Further, each of the neighboring stepping-stone detection apparatuses, having received the stepping-stone detection request message, may detect a stepping stone by comparing the target connection fingerprint, included in the stepping-stone detection request message, with generated candidate connection fingerprints. Furthermore, each neighboring stepping-stone detection apparatus may transmit the results of detection of the stepping stone to the stepping-stone detection apparatus 200 that sent the stepping-stone detection request message.

Hereinafter, the maximum allowable delay time according to an embodiment of the present invention will be described in detail with reference to FIGS. 3 to 5.

There are many cases where stepping stones attempt timing perturbation using a uniformly distributed delay so as to hide their locations. At this time, in order to detect the characteristics of traffic timing generated due to timing perturbation, the present invention defines an artificially added delay by dividing the delay into two streams.

Figure 3:
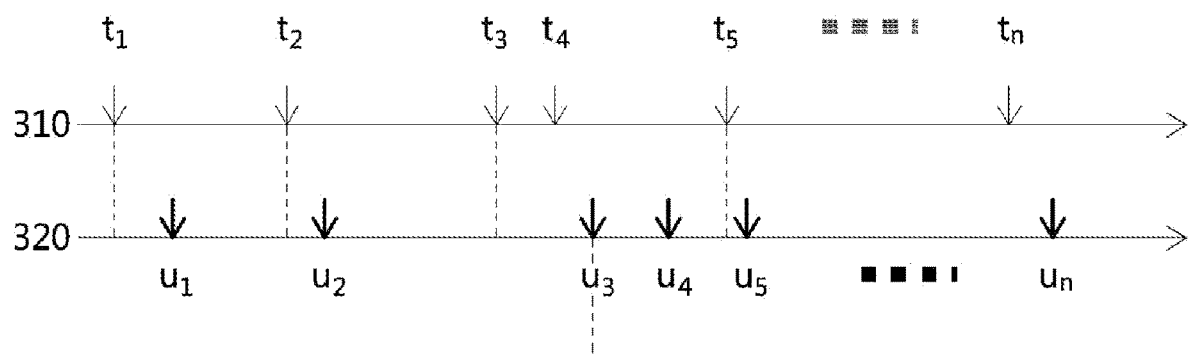
FIGS. 3 and 4 are diagrams illustrating an inbound stream and an outbound stream.
Figure 4:
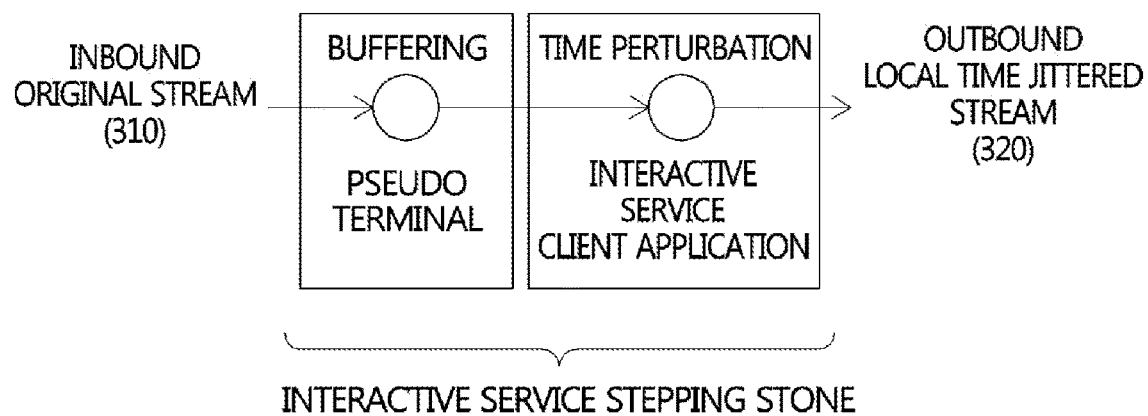

FIGS. 3 and 4 are diagrams for explaining an inbound stream and an outbound stream.

As illustrated in FIGS. 3 and 4, an artificially added delay may be divided into an inbound stream 310 and an outbound stream 320 with respect to an intermediate host.

The inbound stream 310 is also referred to as an "original stream" and includes user input characters $c_1$ to $c_n$ during a time from $t_1$ to $t_n$. The outbound stream 320 is also referred to as a "local time jittered stream" and includes user input characters $c_1$ to $c_n$ during a time from $u_1$ to $u_n$.

As illustrated in FIG. 3, the time $u_i$ (where i=1, 2, . . . , n) is assumed to be obtained by adding a uniformly distributed delay to the time $t_i$ at which an input packet has arrived at the corresponding intermediate host. At this time, unlike the delay artificially added by the attacker, a processing time and a queuing time attributable to packet processing are ignored. Therefore, the added delay conforms to $(u_i-t_i)$~UNIFORM $(0,R)$.

Meanwhile, since a fourth received packet $t_4$ has been reached before a third transmission packet $u_3$, it may be stored in the pseudo terminal queue of the intermediate host. That is, the delay of the fourth packet conforms to $(u_4-u_3)$~UNIFORM $(0,R)$.

In this way, a delay function embedded in an interactive service client program is configured to add a random delay that is independently and identically distributed to the time at which a packet to be transmitted is generated. Therefore, the delay of an i-th packet received through the inbound stream may be defined by the following Equation (1):

$$\begin{cases} (u_i - t_i) \sim \text{UNIFORM}(0, R) & \text{if } t_i > u_{i-1}, \\ (u_i - u_{i-1}) \sim \text{UNIFORM}(0, R) & \text{if } t_i < u_{i-1} \end{cases} \quad (1)$$

As shown in Equation (1), the delay of an i-th packet received through the inbound stream may be determined to be $(u_i-t_i)$~UNIFORM$(0, R)$ or $(u_i-u_{i-1})$~UNIFORM$(0, R)$ based on a time relationship with an i−1-th packet that is relayed through the outbound stream.

When timing perturbation occurs, a divergence problem may occur between the original stream and a modified stream. The time difference between the two streams may be indicated by $\delta_i = u_i - t_i$ (where i=1, 2, . . . , n). Also, a divergence problem may occur depending on inter-arrival times of inbound traffic and the maximum value R of the uniform distribution for artificial timing perturbation. That is, as a result of comparison between the packet arrival intervals (i.e. packet inter-arrival times) of the inbound stream and the maximum value R, if the packet inter-arrival times of the inbound stream are greater than R, the divergence problem may not occur.

Recently, in most cases, packets generated in an interactive service are modeled with a Pareto distribution, and thus it is assumed that the distribution of packet inter-arrival times of the inbound stream conforms to the Pareto distribution. Further, the following Equation (2) is a formula representing the Pareto distribution.

$$F(x) = 1 - \left(\frac{\alpha}{x}\right)^{\beta} \quad (2)$$

where $x \geq \alpha$ is satisfied, $\alpha$ denotes a location parameter, and $\beta$ denotes a shape parameter. Further, when $x < \alpha$, $F(x)=0$ is satisfied.

The probability density function of the Pareto distribution is given by the following Equation (3):

$$f(x) = \frac{\beta \alpha^{\beta}}{x^{\beta+1}} \quad (3)$$

Figure 5:
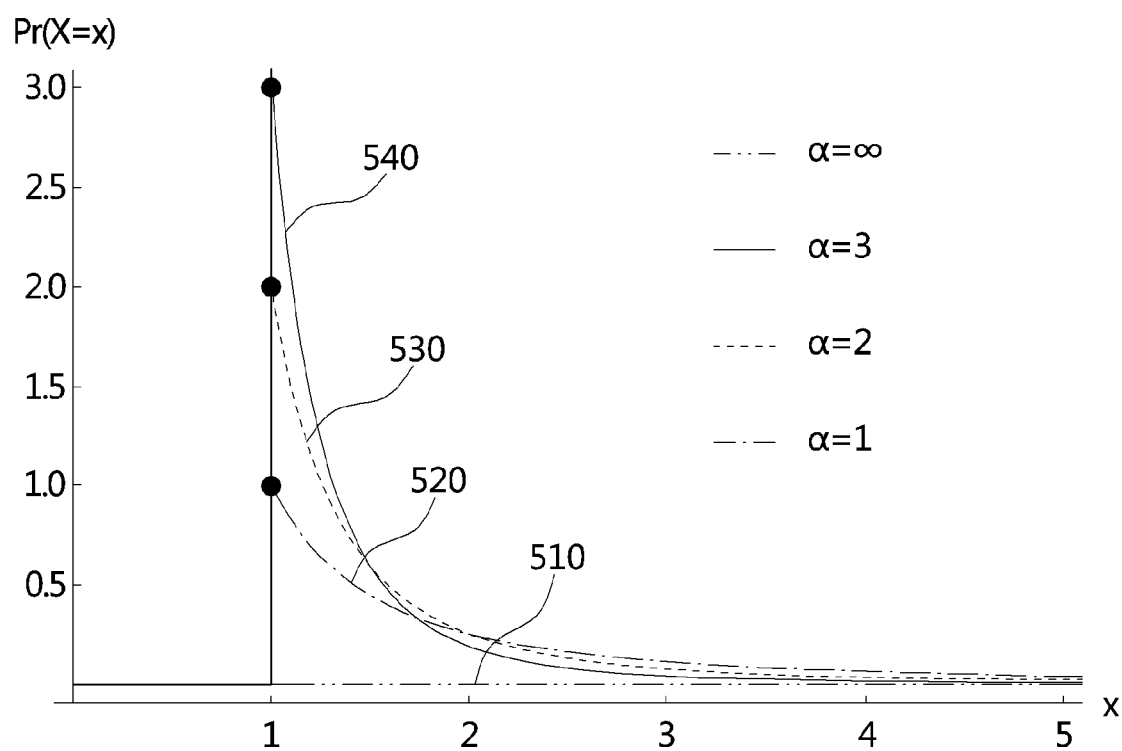
FIG. 5 is a graph illustrating a probability density function of a Pareto distribution.

Further, FIG. 5 is a graph illustrating the probability density function of a Pareto distribution.

In FIG. 5, $\alpha$ denotes a location parameter and shows that, as the value of $\alpha$ is closer to 0, the Pareto distribution approximates an equivalent distribution, and that, as the value of $\alpha$ is larger, the probability density function approximates a Dirac delta function, as shown in FIG. 5.

In order to check the divergence problem of $\delta_i$, which is the time difference between two streams, a simulation is performed using the location parameter ($\alpha$=0.1) and the shape parameter ($\beta$=0.9) of the Pareto distribution. Here, a million packets are used, and a modified stream is generated by artificially adding a uniformly distributed delay.

Considering the change in $\delta_i$ depending on the change in the value of R in uniform distribution for timing perturbation (where R=0.2, 0.4, 0.5, and 1 seconds), the change in $\delta_i$ is limited to 5 seconds or less when the value of R falls within a range of 500 milliseconds. In contrast, when the value of R is 1 second, the value of $\delta_i$ changes within a range of several tens of seconds.

In this way, when a time difference of several tens of seconds or more occurs due to an artificial delay, it is difficult for an attacker to attack the corresponding interactive service. That is, the uniformly distributed delay is maximized when R=0.5.

When the attacker attempts timing perturbation for the purpose of evading detection in an arbitrary stepping stone on an interactive service connection chain, the value of R of the uniformly distributed delay used for timing perturbation may be a maximum of 0.5 seconds. The stepping-stone detection apparatus 200 according to an embodiment of the present invention may set the maximum allowable delay time to 500 milliseconds, that is, 0.5 seconds.

Hereinafter, a stepping-stone detection method performed by the stepping-stone detection apparatus according to an embodiment of the present invention will be described in detail with reference to FIG. 6.

Figure 6:
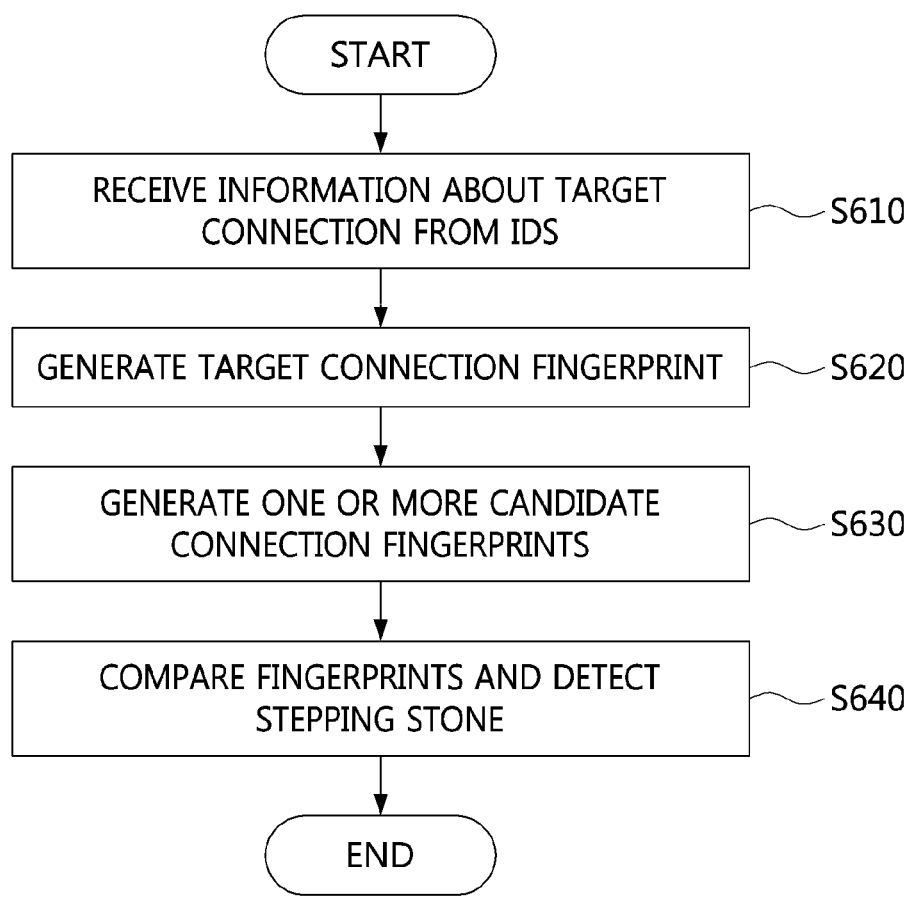
FIG. 6 is a flowchart illustrating a stepping-stone detection method according to an embodiment of the present invention.

FIG. 6 is a flowchart illustrating a stepping-stone detection method according to an embodiment of the present invention.

First, the stepping-stone detection apparatus 200 receives information about a target connection from an Intrusion Detection System (IDS) at step S610.

In detail, the stepping-stone detection apparatus 200 receives information about a target connection, which is a connection corresponding to a last hop of a session in which an attack is attempted using intermediate hosts, from the IDS.

Figure 7:
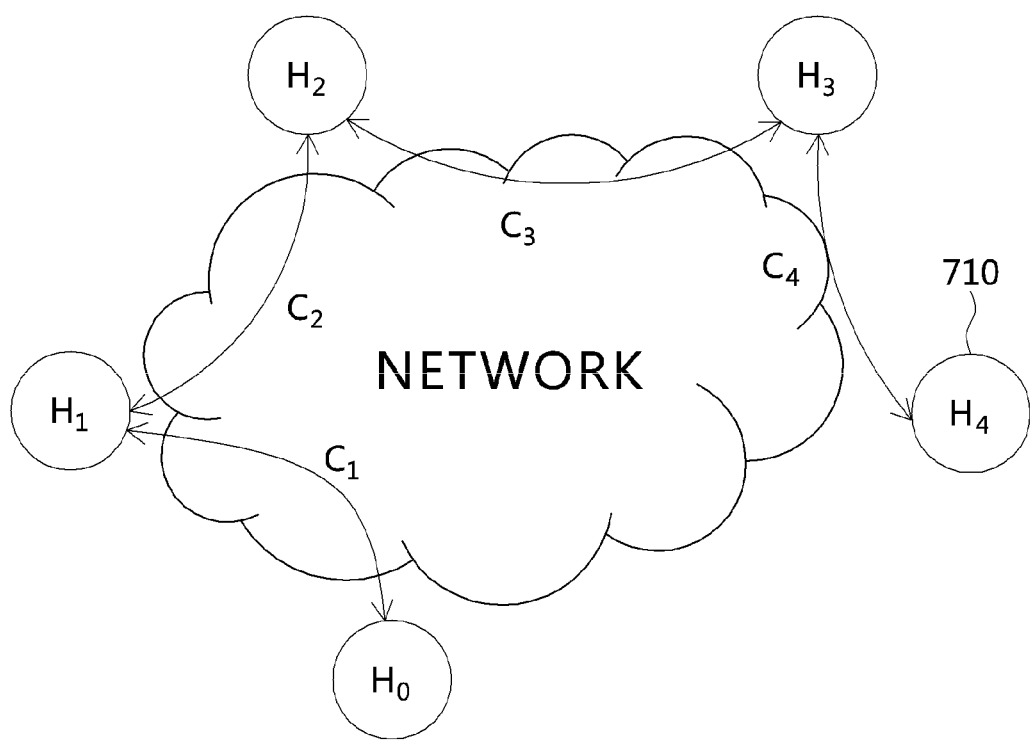
FIG. 7 is a diagram for explaining a connection chain according to an embodiment of the present invention.

FIG. 7 is a diagram for explaining a connection chain according to an embodiment of the present invention.

When a connection chain is formed, as illustrated in FIG. 7, a target connection 710 means $H_4$ corresponding to $C_4$, which is the last connection. Also, the stepping-stone detection apparatus 200 receives information about $H_4$, which is the target connection 710, from the IDS.

Here, the stepping-stone detection apparatus 200 may receive information about a 5-tuple corresponding to the target connection $H_4$ (i.e. a source IP address, a destination IP address, a source port number, a destination port number, and a protocol ID) from the IDS.

Referring back to FIG. 6, the stepping-stone detection apparatus 200 generates a target connection fingerprint using the information about the target connection at step S620.

In detail, the stepping-stone detection apparatus 200 generates the target connection fingerprint based on the information about the target connection received at step S610. The target connection fingerprint may be a vector of ON time duration and OFF time duration corresponding to the information about the target connection.

Thereafter, the stepping-stone detection apparatus 200 generates one or more candidate connection fingerprints at step S630.

In detail, the stepping-stone detection apparatus 200 generates the candidate connection fingerprints using pieces of information about candidate connections corresponding to one or more flow information collectors. Here, the stepping-stone detection apparatus 200 may generate candidate connection fingerprints corresponding to respective candidate connections. Also, each of the candidate connection fingerprints may be a vector of ON time duration and OFF time duration corresponding to the information about the corresponding candidate connection.

Finally, the stepping-stone detection apparatus 200 detects a stepping stone by comparing the target connection fingerprint with the candidate connection fingerprints at step S640.

In detail, the stepping-stone detection apparatus 200 may detect a stepping stone by comparing the target connection fingerprint, generated at step S620, with the candidate connection fingerprints, generated at step S630.

Figure 8:
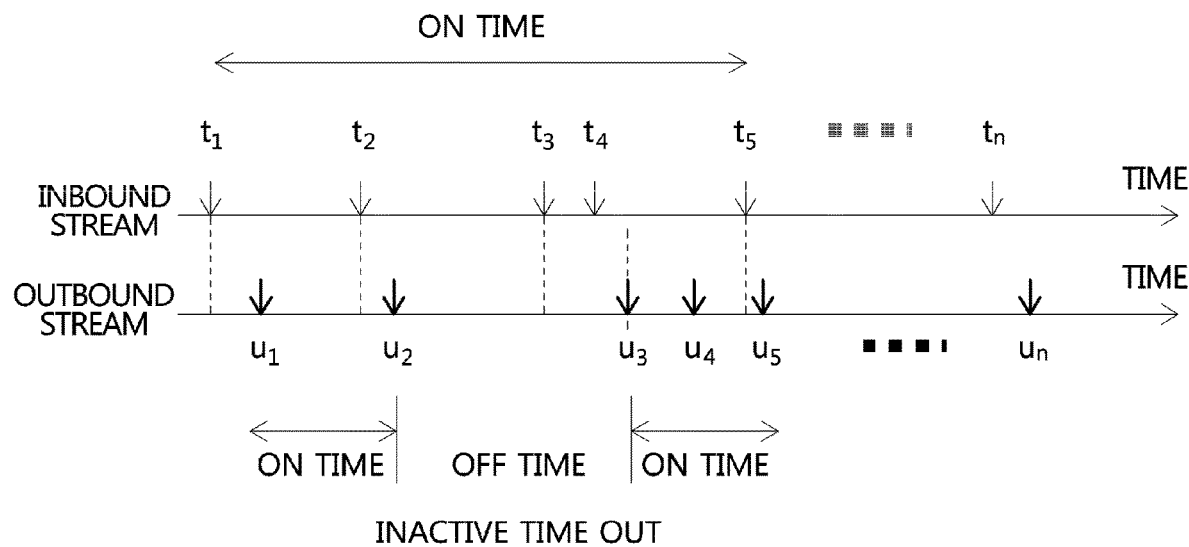
FIG. 8 is a diagram illustrating a phenomenon in which a synchronization error occurs due to the occurrence of timing perturbation.

FIG. 8 is a diagram illustrating a phenomenon in which a synchronization error occurs due to the occurrence of timing perturbation.

When timing perturbation occurs, a synchronization error occurs in which sequence synchronization between the ON time durations and the OFF time durations of the fingerprints of an inbound stream and an outbound stream is broken, as illustrated in FIG. 8.

In order to overcome such a synchronization error, the stepping-stone detection apparatus 200 moves a target connection fingerprint forwards by the maximum allowable delay time and then compares the moved target connection fingerprint with candidate connection fingerprints, as described above. That is, in order to measure a similarity between the ON/OFF vector (sequence) X of the target connection and the ON/OFF vector (sequence) Y of each candidate connection, the target connection fingerprint is moved forwards by the maximum allowable delay time, and then fingerprints of the two streams are compared with each other.

When the fingerprints of the two streams are compared with each other, the stepping-stone detection apparatus 200 calculates a Total Matched Time Ratio (TMTR) between the two streams. The stepping-stone detection apparatus 200 may calculate the TMTR between the two streams for each of ON time duration and OFF time duration, respectively, where the TMTR means the degree of an overlap between the two streams during the ON or OFF time duration.

The TMTR may be calculated, as represented by the following Equation (4):

$$TMTR_{ON}(\delta_{max}) = \frac{\text{Total matched ON time duration between } X(\delta_{max}) \text{ and } Y}{\text{Total ON time duration of } X} \quad (4)$$

Here, the stepping-stone detection apparatus 200 may repeatedly measure the similarity between two connections based on a comparison while performing discrete time jumping/sliding.

Figure 9:
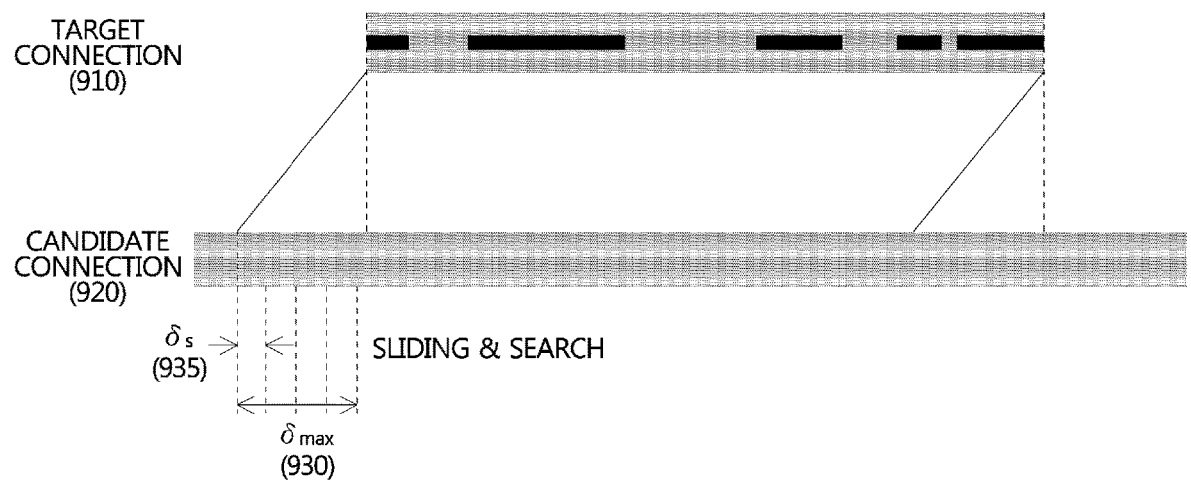
FIG. 9 is a diagram for explaining a procedure for reflecting a maximum allowable delay time according to an embodiment of the present invention.

FIG. 9 is a diagram for explaining a procedure in which the maximum allowable delay time is reflected according to an embodiment of the present invention.

As illustrated in FIG. 9, the stepping-stone detection apparatus 200 repeatedly measures the similarity between two connections within the range of the maximum allowable delay time $\delta_{max}$ 930 based on a comparison while performing discrete-time jumping/sliding on the target connection fingerprint by a unit time $\delta_S$ 935 until a condition of $\delta_{max-n} \times \delta_S \geq 0$ (where n is an integer) is satisfied.

Figure 10:
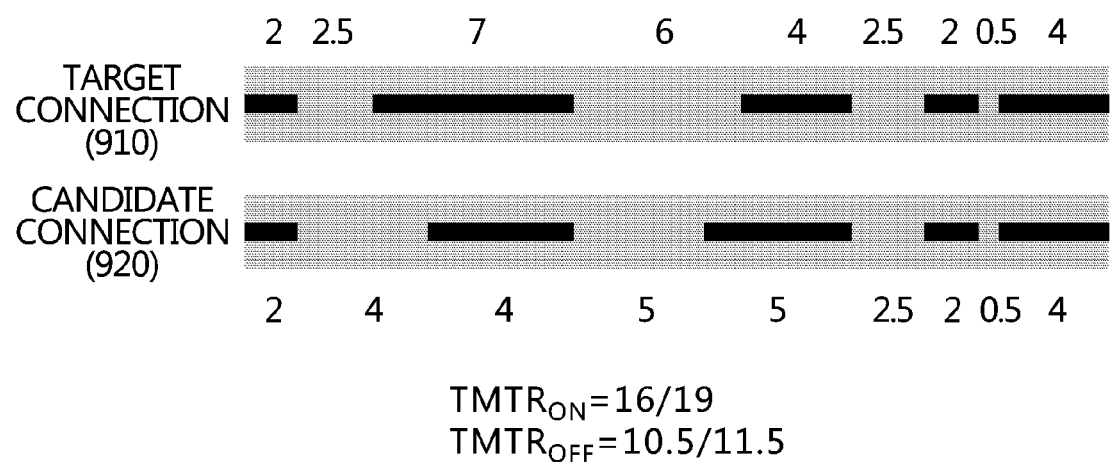
FIG. 10 is a diagram for explaining a procedure for comparing fingerprints with each other according to an embodiment of the present invention.

FIG. 10 is a diagram for explaining a procedure for comparing fingerprints with each other according to an embodiment of the present invention.

As illustrated in FIG. 10, the stepping-stone detection apparatus 200 calculates a total matched time ratio (TMTR) by comparing a target connection fingerprint 910 with a candidate connection fingerprint 920. Here, the stepping-stone detection apparatus 200 may calculate the TMTR for each of the ON time duration and the OFF time duration.

Further, the stepping-stone detection apparatus 200 calculates a correlation value (CV) between two streams, as given by the following Equation (5):

$$CV_{ON}(X, Y) = \max_{n=0,1,\ldots,s,t,\delta_{max}-n\times\delta_s\geq 0} TMTR_{ON}(\delta_{max} - n \times \delta_s) \quad (5)$$

The stepping-stone detection apparatus 200, which calculates the correlation value between the two streams based on Equation (5), may finally determine whether the corresponding connection is a stepping stone based on the following Equation (6).

$$CV_{ON}(X,Y) \geq \theta_{ON} \text{ and } CV_{OFF}(X,Y) \geq \theta_{OFF} \quad (6)$$

When the correlation value between the two streams, calculated based on Equation (5), satisfies the condition of Equation (6), the stepping-stone detection apparatus 200 determines that the target connection and the candidate connection are stepping stones. Further, the stepping-stone detection apparatus 200 may output or store the results of determination of stepping stones.

As described above, when an attacker perturbs timing information of packet streams by applying a uniformly distributed delay to an arbitrary intermediate host on an interactive connection chain, the stepping-stone detection apparatus 200 according to the embodiment of the present invention may detect a connection having a modified traffic stream based on the fingerprint of a target connection, which is a final attack stream.

Further, the stepping-stone detection apparatus 200 according to the embodiment of the present invention may detect attacks that are difficult to detect using conventional technology, that is, a Denial of Service (DoS) attack using a slow rate, a hacking attack that intentionally causes a delay, etc.

Figure 11:
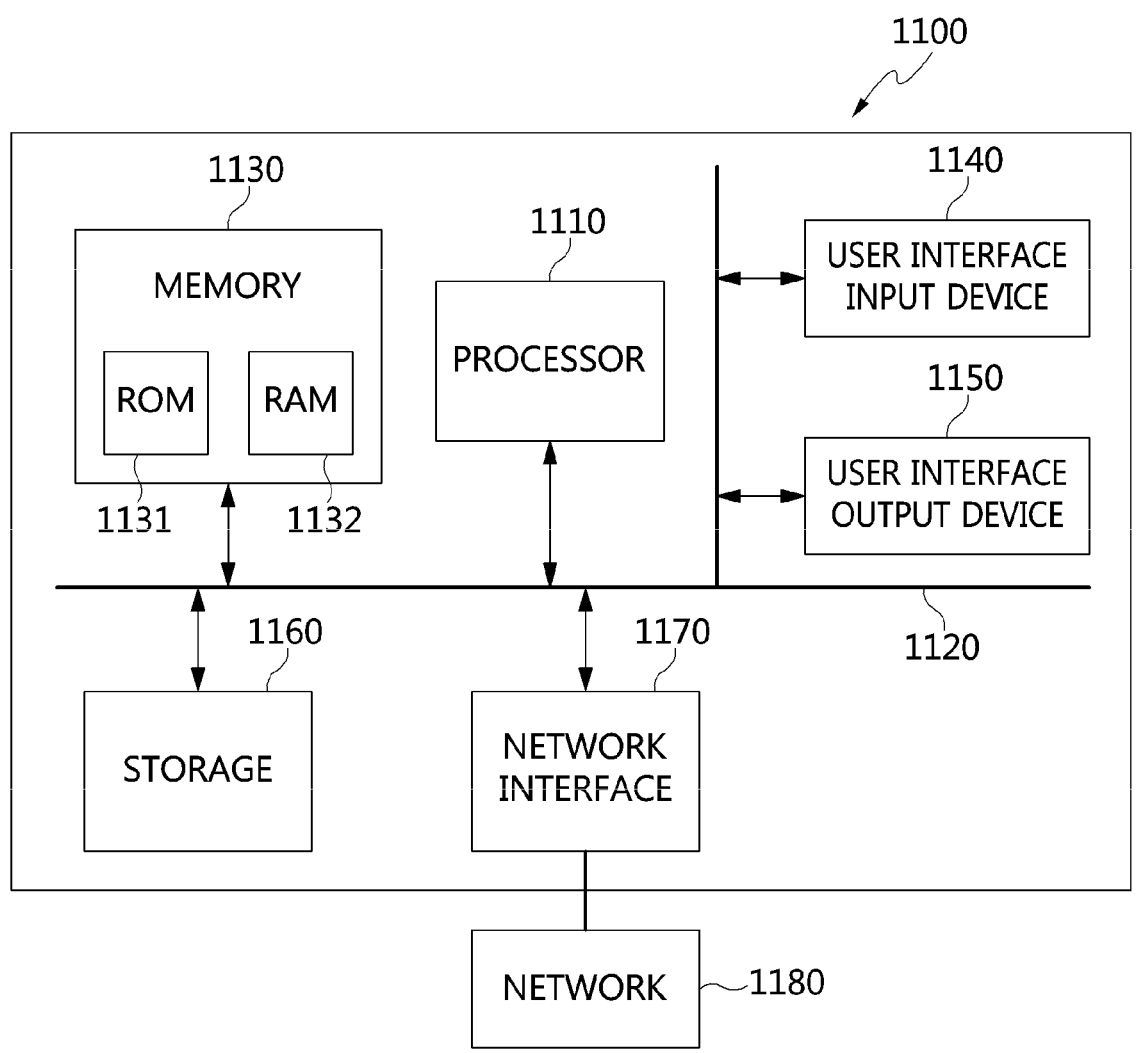
FIG. 11 is a block diagram illustrating a computer system according to an embodiment of the present invention.

FIG. 11 is a block diagram illustrating a computer system according to an embodiment of the present invention.

Referring to FIG. 11, the embodiment of the present invention may be implemented in a computer system 1100 such as a computer-readable storage medium. As shown in FIG. 11, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

Therefore, the embodiment of the present invention may be implemented as a non-temporary computer-readable medium in which a computer-implemented method is recorded or in which computer-executable instructions are recorded. When the computer-executable instructions are executed by the processor, the instructions may perform the method according to at least one aspect of the present invention.

In accordance with the present invention, information about an attack session through which an attacker gains access may be detected, and intermediate hosts in an attack path and the source of an attack may be back-tracked in real time by overcoming timing perturbation technology attempted by the attacker.

Further, in accordance with the present invention, a connection including a modified traffic stream may be detected based on the fingerprint of a final attack stream.

Furthermore, in accordance with the present invention, attacks that are difficult to detect using conventional technology, that is, a Denial of Service (DoS) attack using a slow rate, a hacking attack that intentionally causes a delay, etc., may be detected.

As described above, in the stepping-stone detection apparatus and method according to the present invention, the configurations and schemes in the above-described embodiments are not limitedly applied, and some or all of the above embodiments can be selectively combined and configured so that various modifications are possible.

What is claimed is:

1. A stepping-stone detection apparatus, comprising:
   a target connection information reception unit for receiving information about a target connection from an intrusion detection system (IDS);
   a fingerprint generation unit for generating a target connection fingerprint based on the information about the target connection, and generating one or more candidate connection fingerprints using information about one or more candidate connections corresponding to one or more flow information collectors; and
   a stepping-stone detection unit for detecting a stepping stone by comparing the target connection fingerprint, in which a maximum allowable delay time is reflected, with the candidate connection fingerprints, the stepping stone being an intermediate host in an attack path,
   wherein the target connection fingerprint is a vector of ON time duration and OFF time duration corresponding to the information about the target connection,
      wherein the ON time duration corresponds to a time from a first packet transmission time to a last packet transmission time among packets in which the interval between transmission times of any two packets is within a predetermined time interval,
   wherein the OFF time duration corresponds to a time from a last packet transmission time of the ON time duration to a first packet transmission time of a next ON time duration, and
   wherein the stepping-stone detection unit calculates a total matched time ratio including at least one of a total matched time ratio corresponding to the ON time duration and a total matched time ratio corresponding to the OFF time duration, and determines that the stepping stone has been detected if the calculated total matched time ratio is equal to or greater than a preset threshold.

2. The stepping-stone detection apparatus of claim 1, wherein the stepping-stone detection unit calculates the total matched time ratio corresponding to the ON time duration by dividing information about an overlap between the target connection fingerprint and each candidate connection fingerprint during the ON time duration by the ON time duration of the target connection fingerprint.

3. The stepping-stone detection apparatus of claim 1, wherein the stepping-stone detection unit calculates the total matched time ratio corresponding to the OFF time duration by dividing information about an overlap between the target connection fingerprint and each candidate connection fingerprint during the OFF time duration by the OFF time duration of the target connection fingerprint.

4. The stepping-stone detection apparatus of claim 1, wherein the stepping-stone detection unit determines that the target connection and the corresponding candidate connection are the stepping stone if the total matched time ratio corresponding to the ON time duration is equal to or greater than a first threshold or if the total matched time ratio corresponding to the OFF time duration is equal to or greater than a second threshold.

5. The stepping-stone detection apparatus of claim 1, wherein the stepping-stone detection unit repeatedly compares the target connection fingerprint with each candidate connection fingerprint by performing discrete time jumping/sliding.

6. The stepping-stone detection apparatus of claim 5, wherein the stepping-stone detection unit repeatedly compares the target connection fingerprint with each candidate connection fingerprint by performing the discrete time jumping/sliding by a unit time within a range of the maximum allowable delay time.

7. The stepping-stone detection apparatus of claim 1, further comprising a stepping-stone detection request unit for sending a stepping-stone detection request message to a neighboring stepping-stone detection apparatus.

8. The stepping-stone detection apparatus of claim 7, wherein the stepping-stone detection request unit sends the stepping-stone detection request message, including the target connection fingerprint, to one or more neighboring stepping-stone detection apparatuses.

9. A stepping-stone detection method- performed by a stepping-stone detection apparatus, the method comprising:
    receiving information about a target connection from an intrusion detection system (IDS);
    generating a target connection fingerprint based on the information about the target connection;
    generating one or more candidate connection fingerprints using information about one or more candidate connections corresponding to one or more flow information collectors; and
    detecting a stepping stone by comparing the target connection fingerprint, in which a maximum allowable delay time is reflected, with the candidate connection fingerprints, the stepping stone being an intermediate host in an attack path,
    wherein the target connection fingerprint is a vector of ON time duration and OFF time duration corresponding to the information about the target connection,
    wherein the ON time duration corresponds to a time from a first packet transmission time to a last packet transmission time among packets in which the interval between transmission times of any two packets is within a predetermined time interval,
    wherein the OFF time duration corresponds to a time from a last packet transmission time of the ON time duration to a first packet transmission time of a next ON time duration, and
    wherein detecting the stepping stone comprises:
        calculating a total matched time ratio including at least one of a total matched time ratio corresponding to the ON time duration and a total matched time ratio corresponding to the OFF time duration; and
        determining that the stepping stone has been detected if the calculated total matched time ratio is equal to or greater than a preset threshold.

10. The stepping-stone detection method of claim 9, wherein calculating the total matched time ratio is configured to calculate the total matched time ratio corresponding to the ON time duration by dividing information about an overlap between the target connection fingerprint and each candidate connection fingerprint during the ON time duration by the ON time duration of the target connection fingerprint.

11. The stepping-stone detection method of claim 9, wherein calculating the total matched time ratio is configured to calculate the total matched time ratio corresponding to the OFF time duration by dividing information about an overlap between the target connection fingerprint and each candidate connection fingerprint during the OFF time duration by the OFF time duration of the target connection fingerprint.

12. The stepping-stone detection method of claim 9, wherein determining that the stepping stone has been detected is configured to determine that the target connection and the corresponding candidate connection are the stepping stone if the total matched time ratio corresponding to the ON time duration is equal to or greater than a first threshold or if the total matched time ratio corresponding to the OFF time duration is equal to or greater than a second threshold.

13. The stepping-stone detection method of claim 9, wherein calculating the total matched time ratio is configured to repeatedly compare the target connection fingerprint with each candidate connection fingerprint by performing discrete time jumping/sliding.

14. The stepping-stone detection method of claim 13, wherein calculating the total matched time ratio is configured to repeatedly compare the target connection fingerprint with each candidate connection fingerprint by performing the discrete time jumping/sliding by a unit time within a range of the maximum allowable delay time.

15. The stepping-stone detection method of claim 9, further comprising sending a stepping-stone detection request message to a neighboring stepping-stone detection apparatus.

16. The stepping-stone detection method of claim 15, wherein sending the stepping-stone detection request message is configured to send the stepping-stone detection request message, including the target connection fingerprint, to one or more neighboring stepping-stone detection apparatuses.

* * * * *